US012706700B2

(12) United States Patent
Li et al.

(10) Patent No.: US 12,706,700 B2
(45) Date of Patent: Aug. 11, 2026

(54) UPLINK CONTROL INFORMATION TRANSMISSION METHOD, TERMINAL, AND NETWORK SIDE DEVICE

(71) Applicant: VIVO MOBILE COMMUNICATION CO., LTD., Dongguan (CN)

(72) Inventors: Na Li, Dongguan (CN); Xiaodong Shen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 482 days.

(21) Appl. No.: 18/203,228

(22) Filed: May 30, 2023

(65) Prior Publication Data

US 2023/0308225 A1 Sep. 28, 2023

Related U.S. Application Data

(63) Continuation of application No. PCT/CN2021/135918, filed on Dec. 7, 2021.

(30) Foreign Application Priority Data

Dec. 9, 2020 (CN) ......................... 202011429692.3

(51) Int. Cl.
*H04W 72/21* (2023.01)
*H04L 1/1812* (2023.01)
*H04L 1/1829* (2023.01)

(52) U.S. Cl.
CPC .......... *H04L 1/1854* (2013.01); *H04L 1/1812* (2013.01); *H04W 72/21* (2023.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS 10,805,910 B2 10/2020 Yang et al.
2017/0187507 A1 6/2017 Yum et al.
(Continued)

FOREIGN PATENT DOCUMENTS

| | | | |
|---|---|---|---|
| CN | 104429015 | A | 3/2015 |
| CN | 106470089 | A | 3/2017 |
| CN | 111278143 | A | 6/2020 |
| CN | 111314033 | A | 6/2020 |
| CN | 111836310 | A | 10/2020 |

OTHER PUBLICATIONS

“Exploration of LTE uplink control channel design strategy”, China Academic Journal Electronic Publishing House, Jun. 2016.
(Continued)

*Primary Examiner* — Bo Hui A Zhu
(74) *Attorney, Agent, or Firm* — The Webb Law Firm

(57) ABSTRACT

An uplink control information transmission method includes determining, by a terminal, uplink control information to be multiplexed over one target physical uplink channel for transmission. The uplink control information includes a first HARQ-ACK, a second HARQ-ACK, and CSI. The first HARQ-ACK has a higher priority than the second HARQ-ACK; determining a coding mode of the uplink control information on the target physical uplink channel based on a priority of the CSI and/or based on whether the CSI includes a second part of channel state information CSI-part 2, where the priority of the CSI includes a first priority or a second priority, the first priority being higher than the second priority; and encoding the uplink control information based on the coding mode and transmitting the encoded uplink control information on the target physical uplink channel.

17 Claims, 8 Drawing Sheets

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

2019/0306922 A1 10/2019 Xiong et al.
2020/0228248 A1 7/2020 Islam et al.
2021/0321394 A1 10/2021 Li et al.
2023/0389010 A1* 11/2023 Guo ...................... H04W 72/56
2023/0412324 A1* 12/2023 Bhamri ................. H04L 1/1854

OTHER PUBLICATIONS

Intel Corporation, "On Intra-UE Multiplexing and Prioritization for Release 17 URLLC/IIoT", 3 GPP TSG RAN WG1 Meeting #103-E, e-Meeting, Oct. 26-Nov. 13, 202-, R1-2008987.
Oppo, "Correction on multiplexing HARQ-ACK/SR/CSI in a PUCCH determined based on PRI", 3GPP TSG RAN WG1 #100-E, Athens, Greece, Feb. 24-28, 2020, R1-2000486.
OPPO, "Summary#1 of email thread [103-e-NR-IIOT_URLLC_enh-04]", 3GPP TSG RAN WG1 #102-e, e-Meeting, Aug. 17-28, 2020, R1-2009546.
OPPO, "Summary#3 of email thread [107-e-NR-R17-IIoT-URLLC-04]", 3GPP TSG RAN WG1 #107-e, e-Meeting, Nov. 11-19, 2021, R1-2112785.

* cited by examiner

UPLINK CONTROL INFORMATION TRANSMISSION METHOD, TERMINAL, AND NETWORK SIDE DEVICE

CROSS-REFERENCE TO RELATED APPLICATIONS

This application is a Bypass Continuation application of International Application No. PCT/CN2021/135918 filed Dec. 7, 2021, and claims priority to Chinese Patent Application No. 202011429692.3 filed Dec. 9, 2020, the disclosures of which are incorporated by reference in their entireties.

BACKGROUND OF THE INVENTION

Field of the Invention

This application pertains to the field of wireless communications technologies, and particularly, relates to an uplink control information transmission method and apparatus, a terminal, and a network-side device.

Description of Related Art

In a new radio (NR) system, considering that one user equipment (UE) may support different services at the same time, with different services corresponding to different service requirements of delay, reliability, and the like, a mechanism of marking priorities of physical uplink control channels (PUCCH) and/or physical uplink shared channels (PUSCH) is introduced. Specifically, two physical layer priorities are introduced: high priority and low priority.

SUMMARY OF THE INVENTION

According to a first aspect, an uplink control information transmission method is provided, including: determining, by a terminal, uplink control information to be multiplexed over one target physical uplink channel for transmission, where the uplink control information includes: a first HARQ-ACK, a second HARQ-ACK, and CSI, and the first HARQ-ACK has a higher priority than the second HARQ-ACK; determining a coding mode of the uplink control information on the target physical uplink channel based on a priority of the CSI and/or based on whether the CSI includes a second part of channel state information (CSI-part 2), where the priority of the CSI includes a first priority or a second priority, the first priority being higher than the second priority; and encoding the uplink control information based on the coding mode and transmitting the encoded uplink control information on the target physical uplink channel.

According to a second aspect, an uplink control information transmission apparatus is provided, including: a first determining module, configured to determine uplink control information to be multiplexed over one target physical uplink channel for transmission, where the uplink control information includes: a first HARQ-ACK, a second HARQ-ACK, and channel state information CSI, and the first HARQ-ACK has a higher priority than the second HARQ-ACK; a second determining module, configured to determine a coding mode of the uplink control information on the target physical uplink channel based on a priority of the CSI and/or based on whether the CSI includes a second part of channel state information (CSI-part 2), where the priority of the CSI includes a first priority or a second priority, the first priority being higher than the second priority; and an encoding and transmitting module, configured to encode the uplink control information based on the coding mode and transmit the encoded uplink control information on the target physical uplink channel.

According to a third aspect, an uplink control information transmission method is provided, including: determining, by a network-side device, uplink control information to be multiplexed by a terminal over one target physical uplink channel for transmission, where the uplink control information includes: a first HARQ-ACK, a second HARQ-ACK, and channel state information CSI, and the first HARQ-ACK has a higher priority than the second HARQ-ACK; determining a coding mode of the uplink control information on the target physical uplink channel based on a priority of the CSI and/or based on whether the CSI includes a second part of channel state information (CSI-part 2), where the priority of the CSI includes a first priority and a second priority, the first priority being higher than the second priority; and receiving, based on the coding mode, the uplink control information transmitted on the target uplink control channel.

According to a fourth aspect, an uplink control information transmission apparatus is provided, including: a third determining module, configured to determine uplink control information to be multiplexed by a terminal over one target physical uplink channel for transmission, where the uplink control information includes: a first HARQ-ACK, a second HARQ-ACK, and CSI, and the first HARQ-ACK has a higher priority than the second HARQ-ACK; a fourth determining module, configured to determine a coding mode of the uplink control information on the target physical uplink channel based on a priority of the CSI and/or based on whether the CSI includes a second part of channel state information (CSI-part 2), where the priority of the CSI includes a first priority and a second priority, the first priority being higher than the second priority; and a receiving module, configured to receive, based on the coding mode, the uplink control information transmitted on the target uplink control channel.

According to a fifth aspect, a terminal is provided, where the terminal includes a processor, a memory, and a program or instructions stored in the memory and executable on the processor, and when the program or the instructions are executed by the processor, the steps of the method according to the first aspect are implemented.

According to a sixth aspect, a network-side device is provided, where the network-side device includes a processor, a memory, and a program or instructions stored in the memory and executable on the processor, and when the program or the instructions are executed by the processor, the steps of the method according to the third aspect are implemented.

According to a seventh aspect, a non-transitory computer-readable storage medium is provided, where a program or instructions are stored in the non-transitory computer-readable storage medium, and when the program or the instructions are executed by a processor, the steps of the method according to the first aspect are implemented, or the steps of the method according to the third aspect are implemented.

According to an eighth aspect, a chip is provided, where the chip includes a processor and a communications interface, the communications interface is coupled to the processor, and the processor is configured to execute a program or instructions of a terminal to implement the method according to the first aspect, or the processor is configured to execute a program or instructions of a network-side device to implement the method according to the third aspect.

According to a ninth aspect, a computer program product is provided, where the computer program product includes a processor, a memory, and a program or instructions stored in the memory and executable on the processor, and when the program or the instructions are executed by the processor, the steps of the method according to the first aspect or the steps of the method according to the third aspect are implemented.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
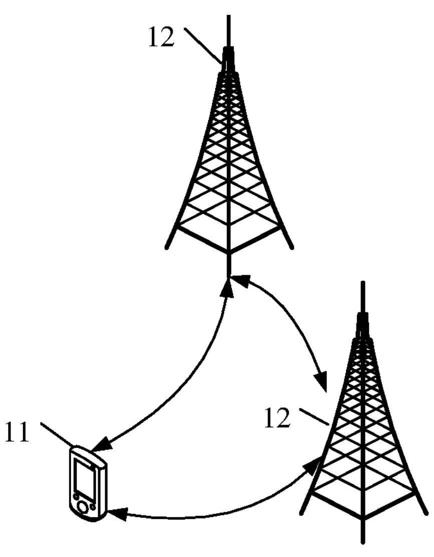
FIG. 1 is a block diagram of a wireless communications system to which the embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a type of the base station is not limited.

The following describes an uplink control information transmission method provided in the embodiments of this application by using embodiments and application scenarios thereof with reference to the accompanying drawings.

At present, because time domain resources of PUCCHs of different priorities overlap, simply discarding a low-priority PUCCH may impose great impact on performance of transmission of low-priority services. To reduce the impact on low-priority transmission, a current communication system supports multiplexing of PUCCHs of different priorities. For example, when time domain resources of a high-priority (HP) hybrid automatic repeat request acknowledgement (HARQ-ACK) PUCCH and a low-priority (LP) HARQ-ACK PUCCH overlap and a specific condition is satisfied, the UE multiplexes the HP HARQ-ACK and LP HARQ-ACK over one PUCCH for transmission. In order to satisfy different reliability requirements and improve resource utilization, the LP HARQ-ACK and the HP HARQ-ACK need to be encoded separately. In this case, channel state information (CSI) such as LP CSI is also multiplexed on the PUCCH. In addition, if the CSI contains a first part of channel state information (CSI-part 1) and a second part of channel state information (CSI-part 2), the CSI-part 1 and the CSI-part 2 need to be encoded separately because a base station needs to first decode the CSI-part 1 before decoding the CSI-part 2. In this case, uplink control information (UCI) multiplexed over one physical uplink channel includes HARQ-ACKs of different priorities and CSI. How to transmit the HARQ-ACKs of different priorities and the CSI over one physical uplink channel is a technical issue that needs to be resolved at present.

Figure 2:
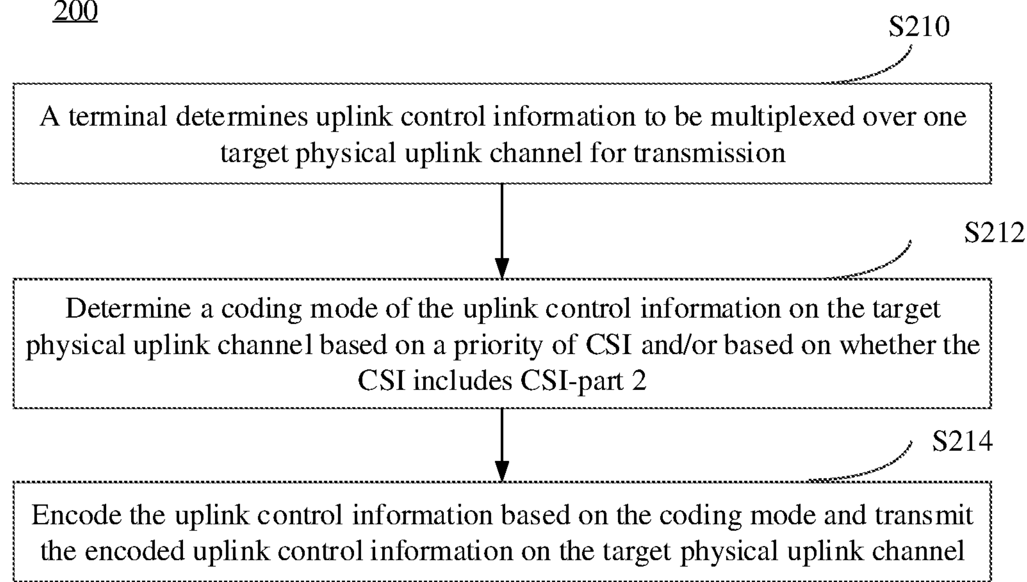
FIG. 2 is a schematic flowchart of an uplink control information transmission method according to an embodiment of this application.

FIG. 2 is a schematic flowchart of an uplink control information transmission method according to an embodiment of this application. The method 200 may be executed by a terminal. In other words, the method may be performed by software or hardware installed on the terminal. As shown in FIG. 2, the method may include the following steps.

S210: The terminal determines uplink control information to be multiplexed over one target physical uplink channel for transmission, where the uplink control information includes: a first HARQ-ACK, a second HARQ-ACK, and CSI, and the first HARQ-ACK has a higher priority than the second HARQ-ACK.

For example, in this embodiment of this application, the first HARQ-ACK is a high-priority (HP) HARQ-ACK and the second HARQ-ACK is a low-priority (LP) HARQ-ACK. That is, in this embodiment of this application, HARQ-ACKs of different priorities and CSI need to be multiplexed over the target physical uplink channel for transmission. The priority in this embodiment of this application may be represented by a priority index, for example, a priority index 0 indicates a low priority and a priority index 1 indicates a high priority.

For example, when time domain resources of a PUCCH transmitting the first HARQ-ACK and a PUCCH transmitting the second HARQ-ACK overlap and a specific condition is satisfied, the UE needs to multiplex the first HARQ-ACK and the second HARQ-ACK over one PUCCH for transmission. In addition, a time domain resource of the PUCCH transmitting the first HARQ-ACK or the PUCCH transmitting the second HARQ-ACK or a PUCCH multiplexing the first HARQ-ACK and the second HARQ-ACK overlap with a time domain resource of a PUCCH transmitting the CSI, and therefore the first HARQ-ACK, the second HARQ-ACK, and the CSI need to be multiplexed over one PUCCH.

S212: Determine a coding mode of the uplink control information on the target physical uplink channel based on a priority of the CSI and/or based on whether the CSI includes CSI-part 2, where the priority of the CSI includes a first priority or a second priority, the first priority being higher than the second priority.

For example, in this embodiment of this application, the priority of the CSI may be a high priority (the first priority) or a low priority (the second priority). During determining of how to encode the first HARQ-ACK, the second HARQ-ACK, and the CSI to be transmitted on the target physical uplink channel, the terminal determines the coding mode of the uplink control information based on the priority of the CSI and/or based on whether the CSI includes the CSI-part 2.

In this embodiment of this application, the target physical uplink channel may include a PUCCH.

In a possible implementation, when the target physical uplink channel is a PUCCH, during determining of the coding mode of the uplink control information in S212, if the CSI includes the CSI-part 2, it is determined that one of the following coding modes 1 to 4 is used.

Mode 1: The first HARQ-ACK is encoded along with the CSI-part 1 of the CSI, and the second HARQ-ACK is encoded along with the CSI-part 2.

Mode 2: The first HARQ-ACK is encoded separately, the second HARQ-ACK is encoded along with the CSI-part 1, and the CSI-part 2 is discarded.

It should be noted that statements "A being encoded along with B, and C being encoded along with D" in this embodiment of this application means that A and B are encoded together to form one code stream and C and D are encoded together to form another code stream, where "A and B" and "C and D" are encoded separately. For example, if the foregoing coding mode 1 is used, during encoding of the uplink control information, the first HARQ-ACK is encoded along with the CSI-part 1 of the CSI, and the second HARQ-ACK is encoded along with the CSI-part 2. For example, two encoders may be used, one encoder for encoding the first HARQ-ACK along with the CSI-part 1 of the CSI, and the other encoder for encoding the second HARQ-ACK along with the CSI-part 2.

Similarly, A being encoded separately and C being encoded along with D means that A is encoded separately to form one code stream, C and D are encoded together to form another code stream, and A is not encoded along with C or D. Other similar statements have similar meanings and are not repeated.

Alternatively, if the priority of the CSI is a first priority or a second priority and the CSI includes no CSI-part 2, it is determined that one of the following coding modes is used.

Mode 3: the CSI is encoded along with the second HARQ-ACK, and the first HARQ-ACK is encoded separately.

Mode 4: the CSI is encoded along with the first HARQ-ACK, and the second HARQ-ACK is encoded separately.

That is, in the foregoing possible implementations, the coding mode of the uplink control information may be determined based on whether the CSI includes the CSI-part 2. If the CSI includes the CSI-part 2, the coding mode of the uplink control information may be determined to be the foregoing mode 1 or mode 2, and if the CSI includes no CSI-part 2, the coding mode of the uplink control information may be determined to be the foregoing mode 3 or mode 4.

Alternatively, the coding mode of the uplink control information may be determined based on the priority of the CSI, or determined based on the priority of the CSI and whether the CSI includes the CSI-part 2.

For example, if the priority of the CSI is a first priority, it is determined that the coding mode of the uplink control information includes one of the following:

(1) if the CSI includes the CSI-part 2, the first HARQ-ACK is encoded along with CSI-part 1 in the CSI, and the second HARQ-ACK is encoded along with the CSI-part 2;

(2) if the CSI includes the CSI-part 2, the first HARQ-ACK is encoded separately, the second HARQ-ACK is encoded along with the CSI-part 1, and the CSI-part 2 is discarded;

(3) if the CSI includes no CSI-part 2, the CSI is encoded along with the second HARQ-ACK, and the first HARQ-ACK is encoded separately; and (4) if the CSI includes no CSI-part 2, the CSI is encoded along with the first HARQ-ACK, and the second HARQ-ACK is encoded separately.

Alternatively, if the priority of the CSI is a second priority and the CSI includes the CSI-part 2, it is determined that the coding mode of the uplink control information is the foregoing mode 1 or mode 2. If the CSI includes no CSI-part 2, it is determined that the coding mode of the uplink control information is the CSI-part 1 being encoded along with the first HARQ-ACK, and the second HARQ-ACK being encoded separately.

Figure 3A:
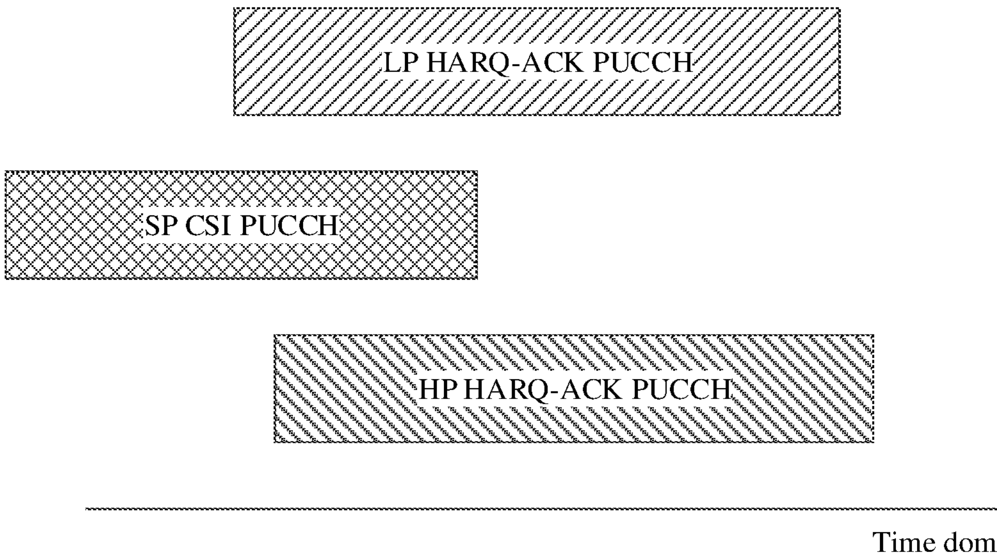
FIG. 3A is a schematic diagram of one type of overlapping time domain resources of physical uplink channels according to an embodiment of this application.
Figure 3B:
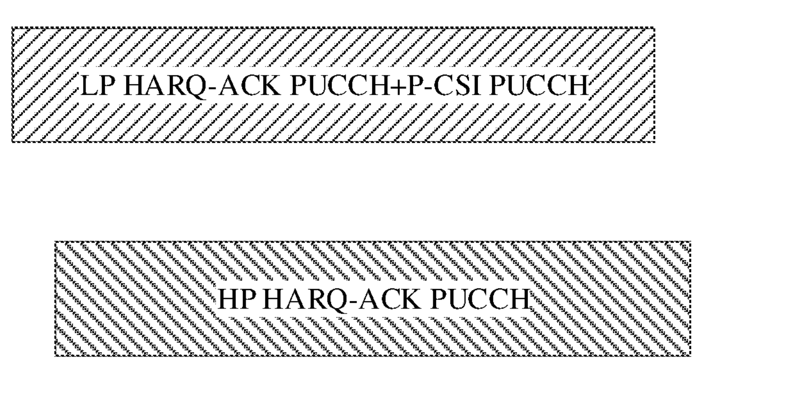
FIG. 3B is a schematic diagram of another type of overlapping time domain resources of physical uplink channels according to an embodiment of this application.

For example, in FIG. 3A, resources overlap between a PUCCH carrying an LP HARQ-ACK, namely LP HARQ-ACK PUCCH, a PUCCH carrying semi-persistent CSI (SP-CSI), namely SP-CSI PUCCH, and a PUCCH carrying an HP HARQ-ACK, namely HP HARQ-ACK PUCCH. In this case, if overlapping between PUCCHs of a same priority is processed and then overlapping between PUCCHs of different priorities is processed, the SP-CSI and the LP HARQ-ACK are multiplexed over one PUCCH. If the PUCCH channel after multiplexing still overlaps with the HP HARQ-ACK PUCCH and a condition for multiplexing the LP PUCCH and the HP HARQ-ACK is satisfied, the UE multiplexes the LP HARQ-ACK, the HP HARQ-ACK, and the SP-CSI over one PUCCH for transmission. Alternatively, as shown in FIG. 3B, one of two PUCCHs is a PUCCH that multiplexes LP HARQ-ACK and periodic CSI (P-CSI), and the other is an HP HARQ-ACK PUCCH. If time domain resources of the two PUCCHs overlap and a condition for multiplexing PUCCHs of different priorities is satisfied, the UE multiplexes the LP HARQ-ACK, the HP HARQ-ACK, and the P-CSI over one PUCCH for transmission.

The SP-CSI or P-CSI carried on the PUCCH is low-priority UCI, and therefore, the UE may determine that the HP HARQ-ACK, the LP HARQ-ACK, and the CSI are encoded in one of the following manners:

(1) If the CSI includes the CSI-part 2, the HP HARQ-ACK is encoded along with the CSI-part 1, and the LP HARQ-ACK is encoded along with the CSI-part 2.

(2) If the CSI includes the CSI-part 2, the HP HARQ-ACK is encoded separately, the LP HARQ-ACK is encoded along with the CSI-part 1, and the CSI-part 2 is discarded.

(3) If the CSI includes no CSI-part 2 (for example, P-CSI), the CSI-part 1 is encoded along with the LP HARQ-ACK, and the HP HARQ-ACK is encoded separately.

(4) If the CSI includes no CSI-part 2, the CSI-part 1 is encoded along with the HP HARQ-ACK, and the LP HARQ-ACK is encoded separately.

Figures 3C, 3D:
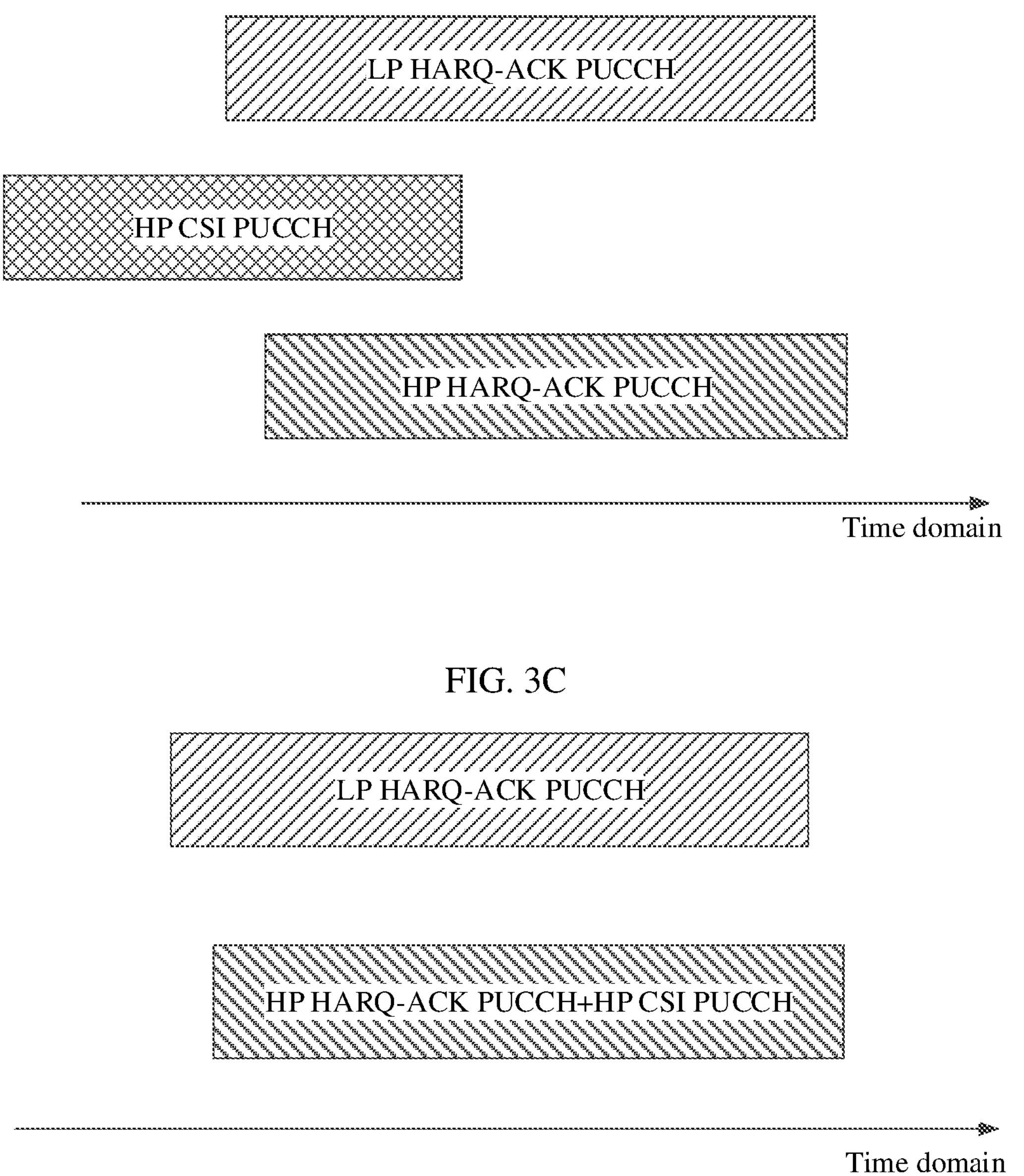
FIG. 3C is a schematic diagram of still another type of overlapping time domain resources of physical uplink channels according to an embodiment of this application.
FIG. 3D is a schematic diagram of yet another type of overlapping time domain resources of physical uplink channels according to an embodiment of this application.

In another example, in FIG. 3C, a resource of the LP HARQ-ACK PUCCH overlaps with those of the HP CSI PUCCH (which is a PUCCH carrying the high-priority CSI) and the HP HARQ-ACK PUCCH. In this case, if overlapping between PUCCHs of a same priority is processed and then overlapping between PUCCHs of different priorities is processed, the HP CSI and HP HARQ-ACK are multiplexed over one PUCCH. Assuming that the multiplexed channel still overlaps with the LP HARQ-ACK PUCCH, and a condition for multiplexing the LP PUCCH and the HP PUCCH is satisfied, the UE multiplexes the LP HARQ-ACK, the HP HARQ-ACK, and the HP CSI over one PUCCH for transmission. Alternatively, as shown in FIG. 3D, one of two PUCCHs is a PUCCH that multiplexes HP HARQ-ACK and HP CSI, and the other is an LP HARQ-ACK PUCCH. If time domain resources of the two PUCCHs overlap and a condition for multiplexing PUCCHs of different priorities is satisfied, the UE multiplexes the LP HARQ-ACK, the HP HARQ-ACK, and the HP CSI over one PUCCH for transmission.

Because the CSI carried on the PUCCH is high-priority CSI in this case, the UE may determine that a coding mode of the HP HARQ-ACK, the LP HARQ-ACK, and the CSI is one of the following:

(1) If the CSI includes the CSI-part 2, the HP HARQ-ACK is encoded along with the CSI-part 1, and the LP HARQ-ACK is encoded along with the CSI-part 2.

(2) If the CSI includes no CSI-part 2, the CSI-part 1 is encoded along with the HP HARQ-ACK, and the LP HARQ-ACK is encoded separately.

In a possible implementation, the uplink control information further includes a first scheduling request (SR) and/or a second SR, where a priority of the first SR is higher than a priority of the second SR. That is, in this possible implementation, the first SR is an HP SR and the second SR is an LP SR.

In a possible implementation, the determining a coding mode of the uplink control information in S212 may further include: determining that the first SR is encoded along with the first HARQ-ACK, and/or that the second SR is encoded along with the second HARQ-ACK.

For example, if the priority of the CSI is a first priority, it is determined that the coding mode of the uplink control information is: if the CSI includes the CSI-part 2, the first HARQ-ACK, the first SR, and the CSI-part 1 are encoded together; and the second HARQ-ACK, the second SR, and the CSI-part 2 are encoded together. If the CSI includes no CSI-part 2, the first HARQ-ACK, the first SR, and the CSI-part 1 are encoded together, and the second HARQ-ACK and the second SR are encoded together.

In another example, if the priority of the CSI is a second priority, it is determined that the coding mode of the uplink control information is one of the following:

(1) if the CSI includes the CSI-part 2, the first HARQ-ACK, the first SR, and the CSI-part 1 are encoded together, and the second HARQ-ACK, the second SR, and the CSI-part 2 are encoded together;

(2) if the CSI includes no CSI-part 2, the first HARQ-ACK and the first SR are encoded together, and the second HARQ-ACK, the second SR, and the CSI-part 1 are encoded together; and (3) if the CSI includes no CSI-part 2, then the CSI-part 1, the first SR, and the first HARQ-ACK are encoded together, and the second HARQ-ACK and the second SR are encoded together.

That is, in this embodiment of this application, in addition to the HP HARQ-ACK, LP HARQ-ACK, and CSI, the UCI multiplexed over one PUCCH may also include an SR, where the SR may include only an LP SR, or only an HP SR, or both the LP SR and the HP SR. In this case, the UE may encode each piece of UCI in the following manner:

I. If the CSI is an LP CSI (that is, CSI of the second priority), it may be determined, based on whether the LP CSI includes CSI-part 2, that the coding mode of the UCI on the PUCCH is as follows:

(i) If the CSI includes the CSI-part 2, the HP HARQ-ACK, the HP SR (if any), and the CSI-part 1 are encoded together, and the LP HARQ-ACK, the LP SR (if any), and the CSI-part 2 are encoded together.

(ii) If the CSI includes no CSI-part 2, then:

(1) the CSI-part 1, the LP HARQ-ACK, and the LP SR (if any) are encoded together, and the HP HARQ-ACK and the HP SR (if any) are encoded together; or (2) the CSI-part 1, the HP HARQ-ACK, and the HP SR (if any) are encoded together, and the LP HARQ-ACK and the LP SR (if any) are encoded together.

II. If the CSI is HP CSI, it may be determined, based on whether the HP CSI includes CSI-part 2, that the coding mode of the UCI on the PUCCH is as follows:

(i) If the CSI includes the CSI-part 2, the HP HARQ-ACK, the HP SR (if any), and the CSI-part 1 are encoded together, and the LP HARQ-ACK, the LP SR (if any), and the CSI-part 2 are encoded together.

(ii) If the CSI includes no CSI-part 2, the CSI-part 1, the HP HARQ-ACK, and the HP SR (if any) are encoded together, and the LP HARQ-ACK and the LP SR (if any) are encoded together.

With the foregoing possible implementations, in a case that the HP HARQ-ACK, LP HARQ-ACK, CSI, and SR are all multiplexed on the PUCCH, the coding mode of the uplink control information on the PUCCH can be determined, so as to resolve resource collision.

In this embodiment of this application, the target physical uplink channel may alternatively include a physical uplink shared channel (PUSCH). For example, when resources of the PUCCH and the PUSCH overlap, the UE multiplexes, over the PUSCH for transmission, the UCI to be transmitted on the PUCCH.

In the foregoing possible implementation, when the target physical uplink channel is a PUSCH, during determining of the coding mode of the uplink control information in S212, the coding mode of the uplink control information may be determined based on whether the CSI includes the CSI-part 2. For example, if the CSI includes no CSI-part 2, it is determined that the first HARQ-ACK, the second HARQ-ACK, and the CSI are encoded separately.

Alternatively, the coding mode of the uplink control information can be determined based on the priority of the CSI. For example, if the priority of the CSI is a second priority and the CSI includes no CSI-part 2, it is determined that the coding mode of the uplink control information is the following mode 1 or mode 2.

Mode 1: The first HARQ-ACK, the second HARQ-ACK, and the CSI are encoded separately.

Mode 2: The first HARQ-ACK is encoded independently and the second HARQ-ACK is encoded along with the CSI.

Alternatively, in S212, it is determined that the coding mode of the uplink control information of the target physical uplink channel may include: if the priority of the CSI is a second priority and the CSI includes the CSI-part 2, it is determined that the coding mode of the uplink control information includes at least one of the following mode 3 to mode 9.

Mode 3: The first HARQ-ACK is encoded separately, the second HARQ-ACK is encoded along with the CSI-part 1 of the CSI, and the CSI-part 2 of the CSI is encoded separately.

Mode 4: The first HARQ-ACK is encoded along with the second HARQ-ACK, the CSI-part 1 of the CSI is encoded separately, and the CSI-part 2 of the CSI is encoded separately.

Mode 5: The first HARQ-ACK is encoded along with the CSI-part 1 of the CSI, and the second HARQ-ACK is encoded along with the CSI-part 2.

Mode 6: The first HARQ-ACK is encoded separately, the second HARQ-ACK is encoded separately, and the CSI-part 1 of the CSI is encoded along with the CSI-part 2.

Optionally, if the foregoing mode 3 to mode 6 are used, the terminal may determine, in a predefined manner, the number of bits and/or the number of occupied resource elements RE obtained after encoding of the CSI-part 2. For example, assuming that rank=1, the terminal determines the number of bits of the corresponding CSI-part 2, determines, based on the number of bits, the number of bits and/or the number of occupied resource elements RE obtained after encoding of the CSI-part 2, and then performs encoding and/or resource mapping on the to-be-actually-transmitted CSI-part 2 based on the determined number of bits and/or the determined number of occupied RE obtained after encoding.

Mode 7: The first HARQ-ACK is encoded separately, the second HARQ-ACK is encoded separately, the CSI-part 1 of the CSI is encoded separately, and the CSI-part 2 is discarded.

In the foregoing possible implementations, if the target physical uplink channel is a PUSCH, during determining of the coding mode of the uplink control information in S212, if the priority of the CSI is a first priority and the CSI includes no CSI-part 2, it is determined that the coding mode of the uplink control information is one of the following:

Mode 8: The first HARQ-ACK, the second HARQ-ACK, and the CSI are encoded separately.

Mode 9: The first HARQ-ACK is encoded along with the CSI and the second HARQ-ACK is encoded separately.

Optionally, if the priority of the CSI is a first priority and the CSI includes the CSI-part 2, it is determined that the coding mode includes at least one of the following mode 10 to mode 16:

Mode 10: The first HARQ-ACK is encoded along with the CSI-part 1 of the CSI, the second HARQ-ACK is encoded separately, and the CSI-part 2 of the CSI is encoded separately.

Mode 11: The first HARQ-ACK is encoded along with the second HARQ-ACK, the CSI-part 1 of the CSI is encoded separately, and the CSI-part 2 of the CSI is encoded separately.

Mode 12: The first HARQ-ACK is encoded along with the CSI-part 1 of the CSI, and the second HARQ-ACK is encoded along with the CSI-part 2.

Mode 13: The first HARQ-ACK is encoded separately, the second HARQ-ACK is encoded separately, and the CSI-part 1 of the CSI is encoded along with the CSI-part 2.

Optionally, if the foregoing mode 2 to mode 13 are used, the terminal may determine, in a predefined manner, the number of bits and/or the number of occupied resource elements RE obtained after encoding of the CSI-part 2. For example, assuming that rank=1, the terminal determines the number of bits of the corresponding CSI-part 2, determines, based on the number of bits, the number of bits and/or the number of occupied resource elements RE obtained after encoding of the CSI-part 2, and then performs encoding and/or resource mapping on the to-be-actually-transmitted CSI-part 2 based on the determined number of bits and/or the determined number of occupied RE obtained after encoding.

Mode 14: The first HARQ-ACK is encoded separately, the second HARQ-ACK is encoded separately, the CSI-part 1 of the CSI is encoded separately, and the CSI-part 2 is discarded.

Mode 15: The first HARQ-ACK is encoded separately, the second HARQ-ACK is encoded along with the CSI-part 1, and the CSI-part 2 is discarded.

Mode 16: The first HARQ-ACK is encoded separately, the CSI-part 1 is encoded separately, the second HARQ-ACK is encoded separately, and the CSI-part 2 is discarded.

Figure 4A:
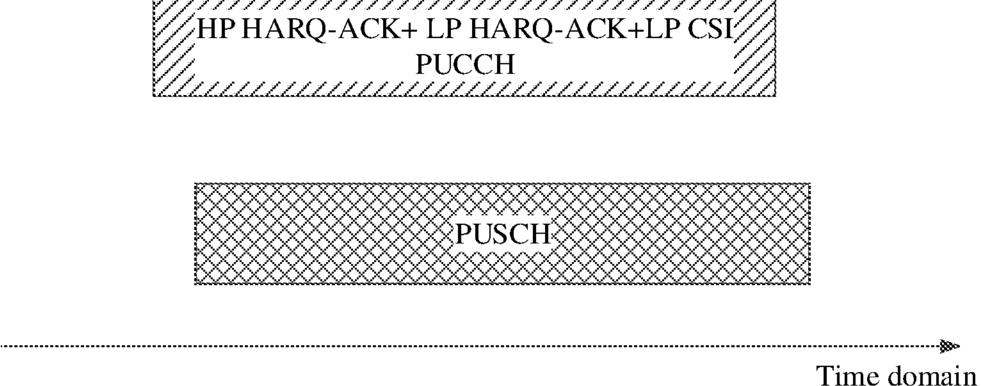
FIG. 4A is a schematic diagram of yet another type of overlapping time domain resources of physical uplink channels according to an embodiment of this application.
Figure 4B:
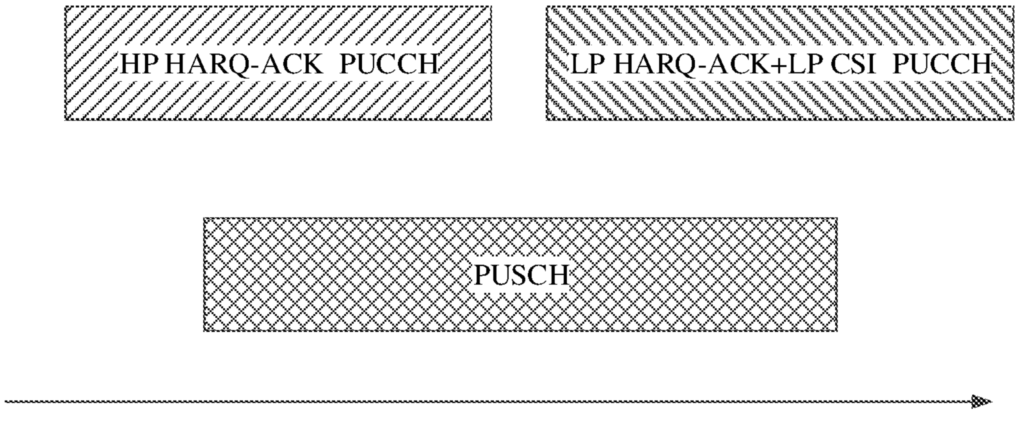
FIG. 4B is a schematic diagram of yet another type of overlapping time domain resources of physical uplink channels according to an embodiment of this application.

For example, in FIG. 4A, a time domain resource of the PUCCH multiplexing the HP HARQ-ACK, the LP HARQ-ACK, and the LP CSI overlaps a time domain resource of the PUSCH, a requirement for multiplexing the PUCCH with the PUSCH is satisfied. In this case, the UE multiplexes, onto the PUSCH, the HP HARQ-ACK, the LP HARQ-ACK, and the LP CSI carried on the PUCCH. In another example, in FIG. 4B, both a time domain resource of a PUCCH carrying the HP HARQ-ACK and a time domain resource of a PUCCH carrying the LP HARQ-ACK and the LP CSI overlap with a time domain resource of a PUSCH, an a requirement for multiplexing the PUCCHs with the PUSCH is satisfied. In this case, the UE multiplexes, onto the PUSCH, the UCI carried on the two PUCCHs.

Then, in the foregoing case, during determining of the coding mode of the uplink control information on the PUSCH, the UE may determine the coding mode of the uplink control information based on whether the CSI includes the CSI-part 2. For example, if the CSI includes no CSI-part 2, the coding mode may include one of the following:

Mode 1: The HP HARQ-ACK, the LP HARQ-ACK, and the CSI are encoded separately, that is, the HP HARQ-ACK, the LP HARQ-ACK, and the CSI each are encoded.

Mode 2: The HP HARQ-ACK and the LP HARQ-ACK+CSI are encoded separately, that is, the HP HARQ-ACK is encoded separately, and the LP HARQ-ACK and the CSI are encoded together.

However, if the CSI includes the CSI-part 2, the coding mode may include one of the following:

Mode 1: The HP HARQ-ACK, the LP HARQ-ACK+CSI-part 1, and the CSI-part 2 are encoded separately.

Mode 2: The HP HARQ-ACK+LP HARQ-ACK, the CSI-part 1, and the CSI-part 2 are encoded separately.

Mode 3: The HP HARQ-ACK+CSI-part 1 and the LP HARQ-ACK+CSI-part 2 are encoded separately.

Mode 4: The HP HARQ-ACK, the LP HARQ-ACK, and the CSI-part 1+CSI-part 2 are encoded separately.

Mode 5: The HP HARQ-ACK, the LP HARQ-ACK, and the CSI-part 1 are encoded separately, and the CSI-part 2 is discarded.

Alternatively, the coding mode of the uplink control information may be determined based on the priority of the CSI. For example, if the CSI is HP CSI, the coding mode used by the UE may include one of the following:

Mode 1: The HP HARQ-ACK+CSI-part 1 and the LP HARQ-ACK+CSI-part 2 are encoded separately.

Mode 2: The HP HARQ-ACK+LP HARQ-ACK, the CSI-part 1, and the CSI-part 2 are encoded separately.

Mode 3: The HP HARQ-ACK+CSI-part 1 and the LP HARQ-ACK+CSI-part 2 are encoded separately.

Mode 4: The HP HARQ-ACK, the LP HARQ-ACK, and the CSI-part 1+CSI-part 2 are encoded separately.

Mode 5: The HP HARQ-ACK, the LP HARQ-ACK, and the CSI-part 1 are encoded separately, and the CSI-part 2 is discarded.

Mode 6: The HP HARQ-ACK and the LP HARQ-ACK+CSI-part 1 are encoded separately, and the CSI-part 2 is discarded.

Mode 7: The HP HARQ-ACK, the CSI-part 1, and the LP HARQ-ACK are encoded separately, and the CSI-part 2 is discarded.

Which mode to be used by the terminal can be configured by the network side by using higher-layer signaling or specified by a protocol, which is not limited in this embodiment of this application.

S214: Encode the uplink control information based on the coding mode and transmit the encoded uplink control information on the target physical uplink channel.

The UE encodes the uplink control information based on the determined coding mode. For example, the UE may encode the to-be-transmitted uplink control information by using a corresponding number of encoders based on the number of to-be-encoded portions determined in the coding mode. For example, if the target physical uplink channel is a PUCCH, two encoders may be used for encoding, and if encoding is performed in the mode 1 for the target physical uplink channel that is a PUCCH, one of the encoders encodes the first HARQ-ACK along with the CSI-part 1 of the CSI, and the other encoder encodes the second HARQ-ACK along with the CSI-part 2. Then, the encoded uplink control information is transmitted on the target physical uplink channel.

In the technical solution provided in this embodiment of this application, when determining that uplink control information to be transmitted on one target physical uplink channel includes a high-priority HARQ-ACK, a low-priority HARQ-ACK, and CSI, the terminal determines a coding mode of the uplink control information on the target physical uplink channel based on a priority of the CSI and/or based on whether the CSI includes CSI-part 2; and then encodes the uplink control information based on the determined coding mode and performs transmission, so as to resolve the problem of how to multiplex HARQ-ACKs of different priorities and CSI over one physical uplink channel for transmission.

Figure 5:
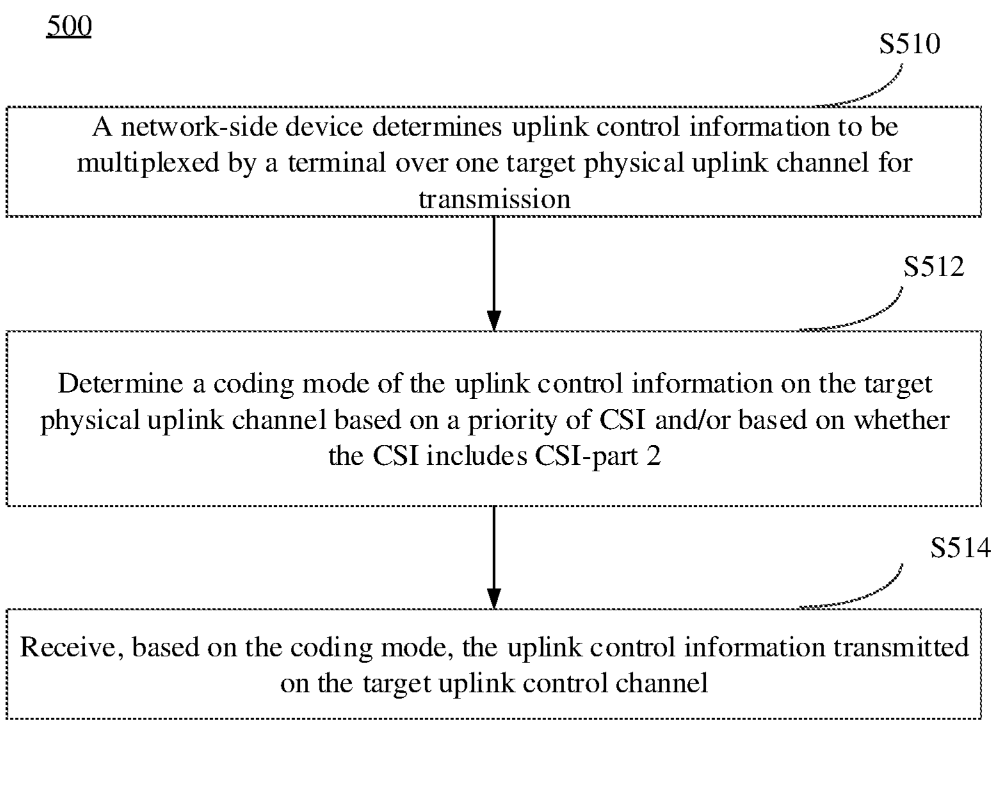
FIG. 5 is another schematic flowchart of an uplink control information transmission method according to an embodiment of this application.

FIG. 5 is a schematic flowchart of an uplink control information transmission method according to an embodiment of this application. The method 500 may be executed by a network-side device. In other words, the method may be performed by software or hardware installed on the network-side device. As shown in FIG. 5, the method may include the following steps.

S510: The network-side device determines uplink control information to be multiplexed by a terminal over one target physical uplink channel for transmission, where the uplink control information includes: a first HARQ-ACK, a second HARQ-ACK, and CSI, and the first HARQ-ACK has a higher priority than the second HARQ-ACK.

S510 corresponds to S210, and the network-side device determines that one target physical uplink channel of the terminal needs to be multiplexed to transmit the uplink control information including the first HARQ-ACK, the second HARQ-ACK, and the CSI. For details, refer to the related description in the foregoing method 200. Details are not repeated herein.

S512: Determine a coding mode of the uplink control information on the target physical uplink channel based on a priority of the CSI and/or based on whether the CSI includes a second part of channel state information CSI-part 2, where the priority of the CSI includes a first priority and a second priority, the first priority being higher than the second priority.

Optionally, the target physical uplink channel may include a PUCCH.

Optionally, the network-side device may use the possible implementations corresponding to the terminal to determine the coding mode of the uplink control information to be transmitted on the PUCCH. For details, refer to the related description in the foregoing method 200. Details are not repeated herein.

In a possible implementation, the first HARQ-ACK and the second HARQ-ACK are multiplexed over one PUCCH for transmission, with the first HARQ-ACK and the second HARQ-ACK being encoded separately. The terminal may not expect to multiplex the CSI on the PUCCH, and in this case, the network-side device needs to guarantee, during scheduling for the terminal, that the uplink control information multiplexed on the PUCCH includes only the first HARQ-ACK and the second HARQ-ACK. Therefore, in this possible implementation, the method may further include: if the first HARQ-ACK and the second HARQ-ACK are multiplexed over one target physical uplink channel for transmission, with the first HARQ-ACK and the second HARQ-ACK being encoded separately, and the terminal does not expect to multiplex the CSI over the target physical uplink channel, the network-side device guarantees, during scheduling for the terminal, that the uplink control information multiplexed over the target physical uplink channel includes only two pieces of information that need to be encoded independently.

Figure 6:
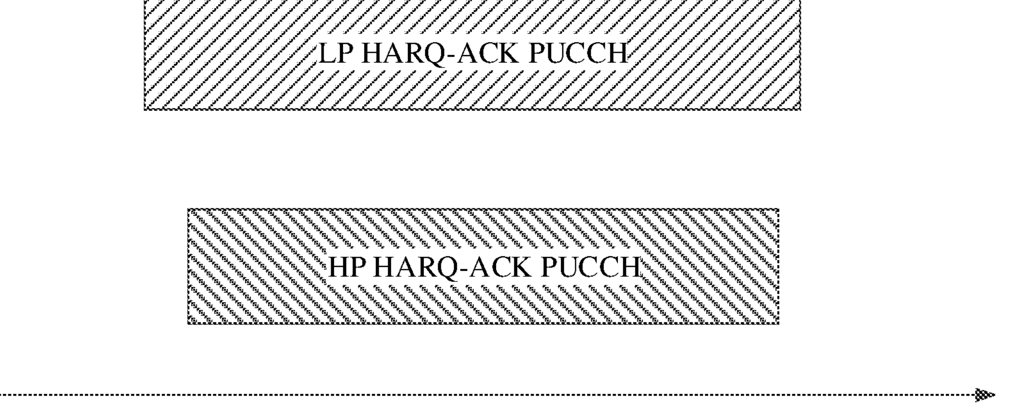
FIG. 6 is a schematic diagram of yet another type of overlapping time domain resources of physical uplink channels according to an embodiment of this application.

For example, in FIG. 6, the LP HARQ-ACK PUCCH and the HP HARQ-ACK PUCCH overlap and a condition for multiplexing HARQ-ACKs with different priorities is satisfied. In this case, the UE multiplexes the LP HARQ-ACK and the HP HARQ-ACK on one PUCCH, and the UE does not expect that the multiplexed PUCCH overlaps with the CSI PUCCH. Alternatively, the UE does not expect that the LP HARQ-ACK overlaps with both the HP HARQ-ACK PUCCH and the CSI PUCCH. Alternatively, the UE does not expect that the HP HARQ-ACK overlaps with both the LP HARQ-ACK PUCCH and the CSI PUCCH. In this case, during scheduling for the terminal, the network-side device guarantees that the uplink control information multiplexed over the target physical uplink channel includes only two pieces of information that need to be encoded independently. In other words, the UE is not scheduled to transmit the HP HARQ-ACK, the LP HARQ-ACK PUCCH, and the CSI simultaneously on an overlapping PUCCH, for example, different time domain resources are assigned for a PUCCH for the HP HARQ-ACK and LP HARQ-ACK and the CSI PUCCH.

Optionally, the target physical uplink channel may include a PUSCH.

Optionally, the network-side device may use the possible implementations corresponding to the terminal to determine the coding mode of the uplink control information to be transmitted on the PUSCH. For details, refer to the related description in the foregoing method 200. Details are not repeated herein.

S514: Receive, based on the coding mode, the uplink control information transmitted on the target uplink control channel.

The network-side device decodes, based on the determined coding mode, the uplink control information transmitted on the target uplink control channel, to obtain various portions of the uplink control information transmitted by the UE.

The foregoing uplink control information transmission method provided in this embodiment of this application improves resource utilization while ensuring reliability of various UCI information, without increasing the number of UCI encoders, when the UCI information transmitted by the PUCCH and/or PUSCH includes HARQ-ACKs of different priorities and the CSI, thereby improving effectiveness of the communication system.

It should be noted that, for the uplink control information transmission method provided in the embodiments of this application, the execution body may be an uplink control information transmission apparatus, or a control module for executing the uplink control information transmission method in the uplink control information transmission apparatus. In this embodiment of this application, the uplink control information transmission apparatus provided in the embodiments of this application is described by using an example in which the uplink control information transmission method is executed by the uplink control information transmission apparatus.

Figure 7:
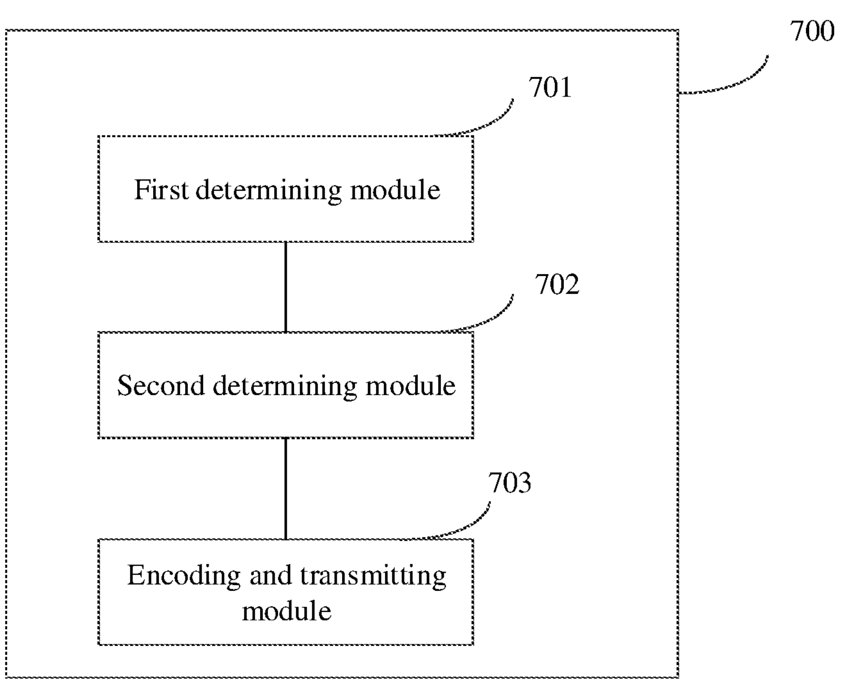
FIG. 7 is a schematic structural flowchart of an uplink control information transmission apparatus according to an embodiment of this application.

FIG. 7 is a schematic structural flowchart of an uplink control information transmission apparatus according to an embodiment of this application. As shown in FIG. 7, the apparatus 700 may include a first determining module 701, a second determining module 702, and an encoding and transmitting module 703.

In this embodiment of this application, the first determining module 701 is configured to determine uplink control information to be multiplexed over one target physical uplink channel for transmission, where the uplink control information includes: a first HARQ-ACK, a second HARQ-ACK, and CSI, and the first HARQ-ACK has a higher priority than the second HARQ-ACK. The second determining module 702 is configured to determine a coding mode of the uplink control information on the target physical uplink channel based on a priority of the CSI and/or based on whether the CSI includes CSI-part 2, where the priority of the CSI includes a first priority or a second priority, the first priority being higher than the second priority. The encoding and transmitting module 703 is configured to encode the uplink control information based on the coding mode and transmit the encoded uplink control information on the target physical uplink channel.

In a possible implementation, the target physical uplink channel includes a physical uplink control channel.

In a possible implementation, that the second determining module 702 determines the coding mode of the uplink control information on the target physical uplink channel includes:

- if the CSI includes the CSI-part 2, determining that the coding mode of the uplink control information is one of the following:
- the first HARQ-ACK being encoded along with a first part of channel state information CSI-part 1 in the CSI, and the second HARQ-ACK being encoded along with the CSI-part 2; and
- the first HARQ-ACK being encoded separately, the second HARQ-ACK being encoded along with the CSI-part 1, and the CSI-part 2 being discarded.

In a possible implementation, that the second determining module 702 determines the coding mode of the uplink control information on the target physical uplink channel includes:

if the CSI includes no CSI-part 2, determining that the coding mode of the uplink control information is one of the following:

the CSI being encoded along with the second HARQ-ACK, and the first HARQ-ACK being encoded separately; and the CSI being encoded along with the first HARQ-ACK, and the second HARQ-ACK being encoded separately.

In a possible implementation, that the second determining module 702 determines the coding mode of the uplink control information on the target physical uplink channel includes:

if a priority of the CSI is a first priority, determining that the coding mode of the uplink control information includes one of the following:

if the CSI includes the CSI-part 2, the first HARQ-ACK being encoded along with CSI-part 1 in the CSI, and the second HARQ-ACK being encoded along with the CSI-part 2;

if the CSI includes the CSI-part 2, the first HARQ-ACK being encoded separately, the second HARQ-ACK being encoded along with the CSI-part 1, and the CSI-part 2 being discarded;

if the CSI includes no CSI-part 2, the CSI being encoded along with the second HARQ-ACK, and the first HARQ-ACK being encoded separately; and if the CSI includes no CSI-part 2, the CSI being encoded along with the first HARQ-ACK, and the second HARQ-ACK being encoded separately.

In a possible implementation, that the second determining module 702 determines the coding mode of the uplink control information on the target physical uplink channel includes:

if a priority of the CSI is a second priority, determining that the coding mode of the uplink control information is one of the following:

if the CSI includes the CSI-part 2, the first HARQ-ACK being encoded along with CSI-part 1 in the CSI, and the second HARQ-ACK being encoded along with the CSI-part 2;

if the CSI includes the CSI-part 2, the first HARQ-ACK being encoded separately, the second HARQ-ACK being encoded along with the CSI-part 1, and the CSI-part 2 being discarded; and if the CSI includes no CSI-part 2, the CSI-part 1 being encoded along with the first HARQ-ACK, and the second HARQ-ACK being encoded separately.

In a possible implementation, the uplink control information further includes a first scheduling request SR and/or a second SR, where a priority of the first SR is higher than a priority of the second SR.

That the second determining module 702 determines the coding mode of the uplink control information on the target physical uplink channel further includes: determining that the first SR is encoded along with the first HARQ-ACK, and/or that the second SR is encoded along with the second HARQ-ACK.

In a possible implementation, the target physical uplink channel includes a physical uplink shared channel.

In a possible implementation, that the second determining module 702 determines the coding mode of the uplink control information on the target physical uplink channel includes:

if the priority of the CSI is a second priority and the CSI includes no CSI-part 2:

determining that the first HARQ-ACK, the second HARQ-ACK, and the CSI are encoded independently; or determining that the first HARQ-ACK is encoded independently and that the second HARQ-ACK is encoded along with the CSI.

In a possible implementation, that the second determining module 702 determines the coding mode of the uplink control information on the target physical uplink channel includes:

if the priority of the CSI is a second priority and the CSI includes the CSI-part 2, determining that the coding mode includes at least one of the following:

the first HARQ-ACK being encoded separately, the second HARQ-ACK being encoded along with CSI-part 1 of the CSI, and the CSI-part 2 of the CSI being encoded separately;

the first HARQ-ACK being encoded along with the second HARQ-ACK, the CSI-part 1 of the CSI being encoded separately, and the CSI-part 2 of the CSI being encoded separately;

the first HARQ-ACK being encoded along with the CSI-part 1 of the CSI, and the second HARQ-ACK being encoded along with the CSI-part 2;

the first HARQ-ACK being encoded separately, the second HARQ-ACK being encoded separately, and the CSI-part 1 of the CSI being encoded along with the CSI-part 2; or the first HARQ-ACK being encoded separately, the second HARQ-ACK being encoded separately, the CSI-part 1 of the CSI being encoded separately, and the CSI-part 2 being discarded.

In a possible implementation, that the second determining module 702 determines the coding mode of the uplink control information on the target physical uplink channel includes:

if the priority of the CSI is a first priority and the CSI includes no CSI-part 2:

determining that the first HARQ-ACK, the second HARQ-ACK, and the CSI are encoded separately; or determining that the first HARQ-ACK is encoded along with the CSI and that the second HARQ-ACK is encoded separately.

In a possible implementation, that the second determining module 702 determines the coding mode of the uplink control information on the target physical uplink channel includes:

if the priority of the CSI is a first priority and the CSI includes the CSI-part 2, determining that the coding mode includes at least one of the following:

the first HARQ-ACK being encoded along with the CSI-part 1 of the CSI, the second HARQ-ACK being encoded separately, and the CSI-part 2 of the CSI being encoded separately;

the first HARQ-ACK being encoded along with the second HARQ-ACK, the CSI-part 1 of the CSI being encoded separately, and the CSI-part 2 of the CSI being encoded separately;

the first HARQ-ACK being encoded along with the CSI-part 1 of the CSI, and the second HARQ-ACK being encoded along with the CSI-part 2;

the first HARQ-ACK being encoded separately, the second HARQ-ACK being encoded separately, and the CSI-part 1 of the CSI being encoded along with the CSI-part 2; or

- the first HARQ-ACK being encoded separately, the second HARQ-ACK being encoded separately, the CSI-part 1 of the CSI being encoded separately, and the CSI-part 2 being discarded;
- the first HARQ-ACK being encoded separately, the second HARQ-ACK being encoded along with the CSI-part 1, and the CSI-part 2 being discarded; and
- the first HARQ-ACK being encoded separately, the CSI-part 1 being encoded separately, the second HARQ-ACK being encoded separately, and the CSI-part 2 being discarded.

The uplink control information transmission apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not limited in this embodiment of this application.

The uplink control information transmission apparatus in this embodiment of this application may be an apparatus with an operating system. The operating system may be an Android operating system, an iOS operating system, or other possible operating systems, and is not limited in the embodiments of this application.

The uplink control information transmission apparatus provided in this embodiment of this application is capable of implementing the processes implemented in the method embodiments in FIG. 2 to FIG. 4, with the same technical effects achieved. To avoid repetition, details are not described herein again.

Figure 8:
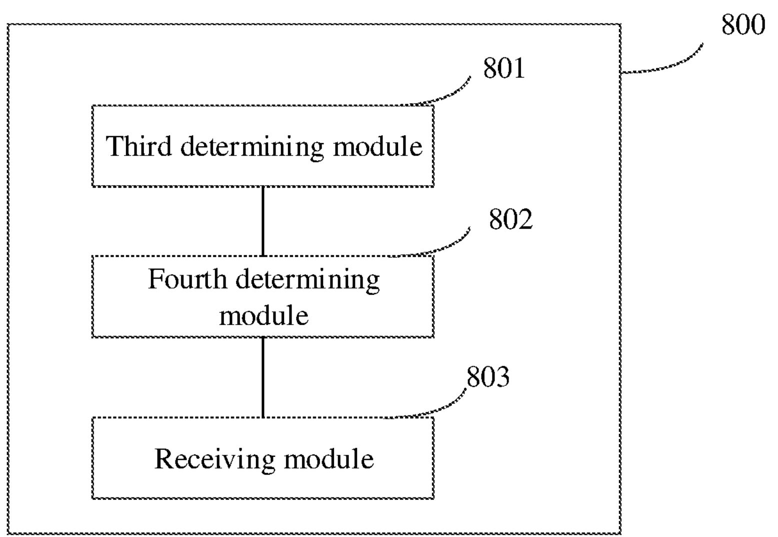
FIG. 8 is another schematic structural diagram of an uplink control information transmission apparatus according to an embodiment of this application.

FIG. 8 is another schematic structural diagram of an uplink control information transmission apparatus according to an embodiment of this application. As shown in FIG. 8, the apparatus 800 may include a third determining module 801, a fourth determining module 802, and a receiving module 803.

In this embodiment of this application, the third determining module 801 is configured to determine uplink control information to be multiplexed by a terminal over one target physical uplink channel for transmission, where the uplink control information includes: a first HARQ-ACK, a second HARQ-ACK, and CSI, and the first HARQ-ACK has a higher priority than the second HARQ-ACK. The fourth determining module 802 is configured to determine a coding mode of the uplink control information on the target physical uplink channel based on a priority of the CSI and/or based on whether the CSI includes CSI-part 2, where the priority of the CSI includes a first priority and a second priority, the first priority being higher than the second priority. The receiving module 803 is configured to receive, based on the coding mode, the uplink control information transmitted on the target uplink control channel.

In a possible implementation, the target physical uplink channel includes a physical uplink control channel.

In a possible implementation, that the fourth determining module 802 determines the coding mode of the uplink control information on the target physical uplink channel includes:

- if the CSI includes the CSI-part 2, determining that the coding mode of the uplink control information includes one of the following:
- the first HARQ-ACK being encoded along with a first part of channel state information CSI-part 1 in the CSI, and the second HARQ-ACK being encoded along with the CSI-part 2; and
- the first HARQ-ACK being encoded separately, the second HARQ-ACK being encoded along with the CSI-part 1, and the CSI-part 2 being discarded.

In a possible implementation, that the fourth determining module 802 determines the coding mode of the uplink control information on the target physical uplink channel includes:

- if the CSI includes no CSI-part 2, determining that the coding mode of the uplink control information is one of the following:
- the CSI being encoded along with the second HARQ-ACK, and the first HARQ-ACK being encoded separately; and
- the CSI being encoded along with the first HARQ-ACK, and the second HARQ-ACK being encoded separately.

In a possible implementation, that the fourth determining module 802 determines the coding mode of the uplink control information on the target physical uplink channel includes:

- if a priority of the CSI is a first priority, determining that the coding mode of the uplink control information includes one of the following:
- if the CSI includes the CSI-part 2, the first HARQ-ACK being encoded along with CSI-part 1 in the CSI, and the second HARQ-ACK being encoded along with the CSI-part 2;
- if the CSI includes the CSI-part 2, the first HARQ-ACK being encoded separately, the second HARQ-ACK being encoded along with the CSI-part 1, and the CSI-part 2 being discarded;
- if the CSI includes no CSI-part 2, the CSI being encoded along with the second HARQ-ACK, and the first HARQ-ACK being encoded separately; and
- if the CSI includes no CSI-part 2, the CSI being encoded along with the first HARQ-ACK, and the second HARQ-ACK being encoded separately.

In a possible implementation, that the fourth determining module 802 determines the coding mode of the uplink control information on the target physical uplink channel includes:

- if a priority of the CSI is a second priority, determining that the coding mode of the uplink control information is one of the following:
- if the CSI includes the CSI-part 2, the first HARQ-ACK being encoded along with CSI-part 1 in the CSI, and the second HARQ-ACK being encoded along with the CSI-part 2;
- if the CSI includes the CSI-part 2, the first HARQ-ACK being encoded separately, the second HARQ-ACK being encoded along with the CSI-part 1, and the CSI-part 2 being discarded; and
- if the CSI includes no CSI-part 2, the CSI-part 1 being encoded along with the first HARQ-ACK, and the second HARQ-ACK being encoded separately.

In a possible implementation, the uplink control information further includes a first scheduling request SR and/or a second SR, where a priority of the first SR is higher than a priority of the second SR.

That the fourth determining module 802 determines the coding mode of the uplink control information on the target physical uplink channel further includes: determining that the first SR is encoded along with the first HARQ-ACK, and/or that the second SR is encoded along with the second HARQ-ACK.

In a possible implementation, the apparatus further includes:

a scheduling module, configured to: if the first HARQ-ACK and the second HARQ-ACK are multiplexed over one target physical uplink channel for transmission, the first HARQ-ACK and the second HARQ-ACK are encoded separately, and the terminal does not expect to multiplex the CSI over the target physical uplink channel, guarantee, during scheduling for the terminal, that the uplink control information multiplexed over the target physical uplink channel includes only two pieces of information that need to be encoded independently.

In a possible implementation, the target physical uplink channel includes a physical uplink shared channel.

In a possible implementation, that the fourth determining module 802 determines the coding mode of the uplink control information on the target physical uplink channel includes:

if the priority of the CSI is a second priority and the CSI includes no CSI-part 2:

determining that the first HARQ-ACK, the second HARQ-ACK, and the CSI are encoded independently; or determining that the first HARQ-ACK is encoded independently and that the second HARQ-ACK is encoded along with the CSI.

In a possible implementation, that the fourth determining module 802 determines the coding mode of the uplink control information on the target physical uplink channel includes:

if the priority of the CSI is a second priority and the CSI includes the CSI-part 2, determining that the coding mode includes at least one of the following:

the first HARQ-ACK being encoded separately, the second HARQ-ACK being encoded along with CSI-part 1 of the CSI, and the CSI-part 2 of the CSI being encoded separately;

the first HARQ-ACK being encoded along with the second HARQ-ACK, the CSI-part 1 of the CSI being encoded separately, and the CSI-part 2 of the CSI being encoded separately;

the first HARQ-ACK being encoded along with the CSI-part 1 of the CSI, and the second HARQ-ACK being encoded along with the CSI-part 2;

the first HARQ-ACK being encoded separately, the second HARQ-ACK being encoded separately, and the CSI-part 1 of the CSI being encoded along with the CSI-part 2; or the first HARQ-ACK being encoded separately, the second HARQ-ACK being encoded separately, the CSI-part 1 of the CSI being encoded separately, and the CSI-part 2 being discarded.

In a possible implementation, that the fourth determining module 802 determines the coding mode of the uplink control information on the target physical uplink channel includes:

if the priority of the CSI is a first priority and the CSI includes no CSI-part 2:

determining that the first HARQ-ACK, the second HARQ-ACK, and the CSI are encoded separately; or determining that the first HARQ-ACK is encoded along with the CSI and that the second HARQ-ACK is encoded separately.

In a possible implementation, that the fourth determining module 802 determines the coding mode of the uplink control information on the target physical uplink channel includes:

if the priority of the CSI is a first priority and the CSI includes the CSI-part 2, determining that the coding mode includes at least one of the following:

the first HARQ-ACK being encoded along with the CSI-part 1 of the CSI, the second HARQ-ACK being encoded separately, and the CSI-part 2 of the CSI being encoded separately;

the first HARQ-ACK being encoded along with the second HARQ-ACK, the CSI-part 1 of the CSI being encoded separately, and the CSI-part 2 of the CSI being encoded separately;

the first HARQ-ACK being encoded along with the CSI-part 1 of the CSI, and the second HARQ-ACK being encoded along with the CSI-part 2;

the first HARQ-ACK being encoded separately, the second HARQ-ACK being encoded separately, and the CSI-part 1 of the CSI being encoded along with the CSI-part 2;

the first HARQ-ACK being encoded separately, the second HARQ-ACK being encoded separately, the CSI-part 1 of the CSI being encoded separately, and the CSI-part 2 being discarded;

the first HARQ-ACK being encoded separately, the second HARQ-ACK being encoded along with the CSI-part 1, and the CSI-part 2 being discarded; or the first HARQ-ACK being encoded separately, the CSI-part 1 being encoded separately, the second HARQ-ACK being encoded separately, and the CSI-part 2 being discarded.

The uplink control information transmission apparatus in this embodiment of this application may be an apparatus, or may be a component, an integrated circuit, or a chip in a network-side device. The apparatus may be a base station. For example, the base station may include, but is not limited to, the types of the network-side device 12 listed above, which is not limited in this embodiment of this application.

The uplink control information transmission apparatus in this embodiment of this application may be an apparatus with an operating system. The operating system may be an Android operating system, an iOS operating system, or other possible operating systems, and is not limited in the embodiments of this application.

The uplink control information transmission apparatus provided in this embodiment of this application is capable of implementing the processes implemented in the method embodiment in FIG. 5, with the same technical effects achieved. To avoid repetition, details are not described herein again.

Figure 9:
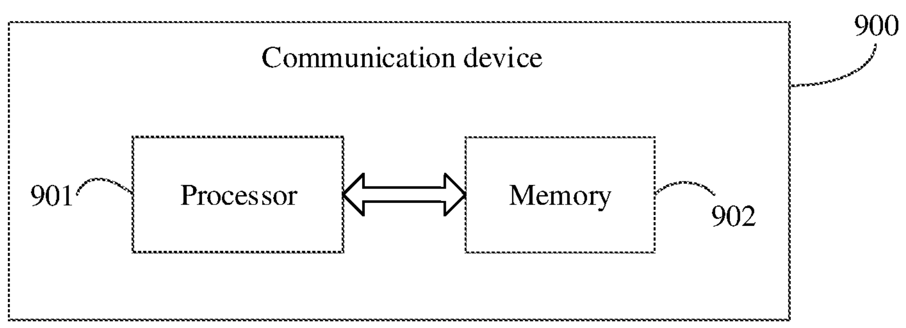
FIG. 9 is a schematic structural diagram of a communication device according to an embodiment of this application.

Optionally, as shown in FIG. 9, an embodiment of this application further provides a communication device 900, including a processor 901, a memory 902, and a program or instructions stored in the memory 902 and executable on the processor 901. For example, when the communication device 900 is a terminal and when the program or the instructions are executed by the processor 901, the processes of the foregoing embodiment of the uplink control information transmission method shown in FIG. 2 are implemented, with the same technical effects achieved. When the communication device 900 is a network-side device and when the program or the instructions are executed by the processor 901, the processes of the foregoing embodiment of the uplink control information transmission method shown in FIG. 5 are implemented, with the same technical effects achieved. To avoid repetition, details are not described herein again.

Figure 10:
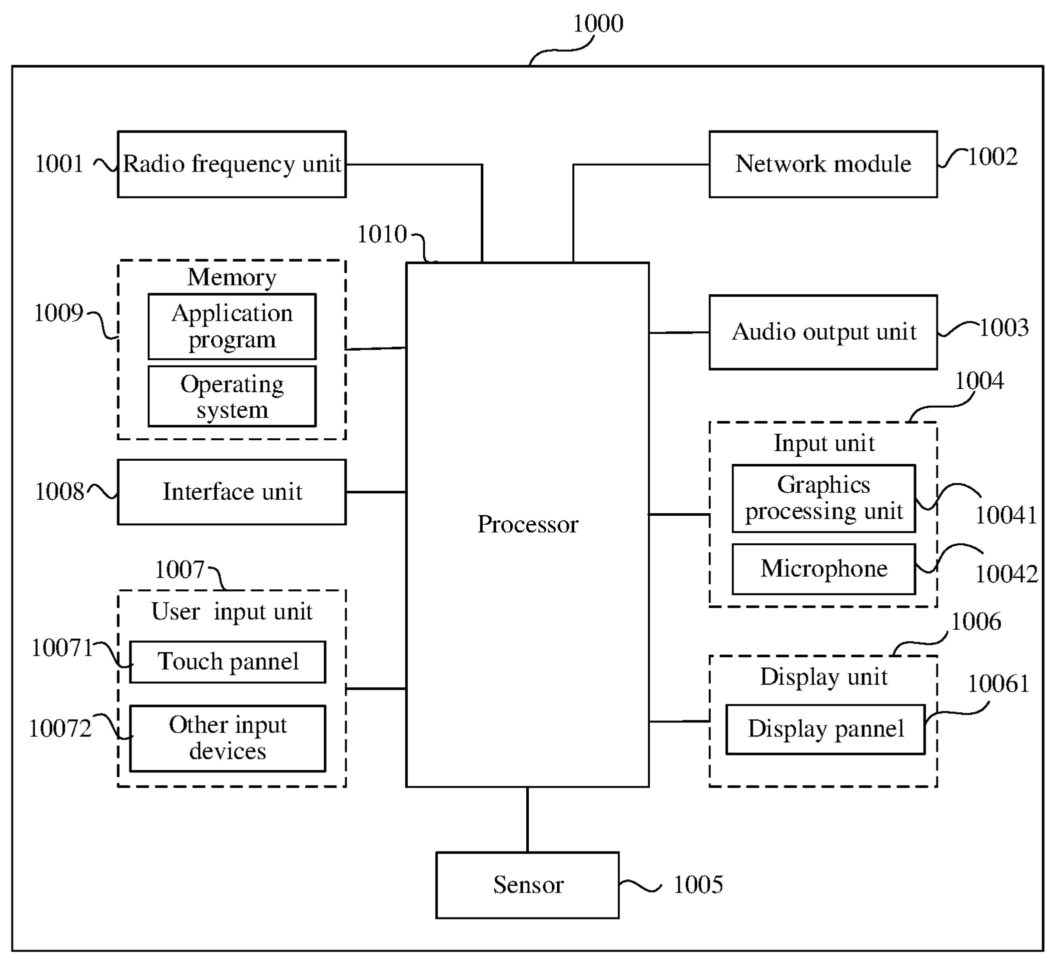
FIG. 10 is a schematic diagram of a hardware structure of a terminal according to an embodiment of this application.

FIG. 10 is a schematic diagram of a hardware structure of a terminal for implementing the embodiments of this application.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Persons skilled in the art can understand that the terminal 1000 may further include a power supply (for example, a battery) supplying power to the components, and the power supply may be logically connected to the processor 1010 through a power management system. In this way, functions such as charge management, discharge management, and power consumption management are implemented by using the power management system. The structure of the terminal shown in FIG. 10 does not constitute any limitation on the terminal. The terminal may include more or fewer components than those shown in the figure, or a combination of some components, or the components disposed differently. Details are not described herein again.

It can be understood that in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, and the like. The user input unit 1007 may include a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein.

In this embodiment of this application, the radio frequency unit 1001 receives downlink data from a network-side device, and then sends the downlink data to the processor 1010 for processing; and also sends uplink data to the network-side device. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may include a program or instruction storage area and a data storage area. The program or instruction storage area may store an operating system, an application program or instruction required by at least one function (for example, a sound playback function or an image playback function), and the like. In addition, the memory 1009 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 1010 may include one or more processing units. Optionally, an application processor and a modem processor may be integrated in the processor 1010. The application processor primarily processes an operating system, user interfaces, application programs or instructions, and the like. The modem processor primarily processes radio communication, for example, being a baseband processor. It can be understood that the modem processor may alternatively be not integrated in the processor 1010.

The processor 1010 is configured to:

determine uplink control information to be multiplexed over one target physical uplink channel for transmission, where the uplink control information includes: a first hybrid automatic repeat request acknowledgement HARQ-ACK, a second HARQ-ACK, and channel state information (CSI), and the first HARQ-ACK has a higher priority than the second HARQ-ACK;

determine a coding mode of the uplink control information on the target physical uplink channel based on a priority of the CSI and/or based on whether the CSI includes a second part of channel state information (CSI-part 2), where the priority of the CSI includes a first priority or a second priority, the first priority being higher than the second priority; and encode the uplink control information based on the coding mode.

The radio frequency unit 1001 is configured to transmit the encoded uplink control information on the target physical uplink channel.

The terminal 1000 provided in this embodiment of this application is capable of implementing the processes implemented by the terminal in the method 200, with the same technical effects achieved. To avoid repetition, details are not described herein again.

Figure 11:
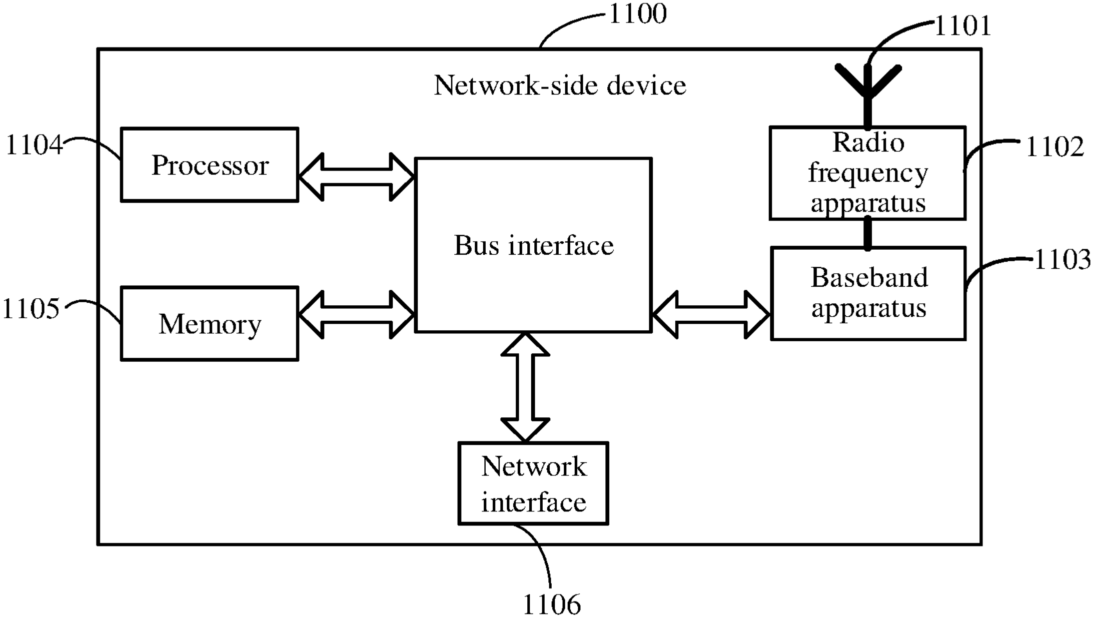
FIG. 11 is a schematic diagram of a hardware structure of a network-side device according to an embodiment of this application.

For example, an embodiment of this application further provides a network-side device. As shown in FIG. 11, the network device 1100 includes an antenna 1101, a radio frequency apparatus 1102, and a baseband apparatus 1103. The antenna 1101 is connected to the radio frequency apparatus 1102. In an uplink direction, the radio frequency apparatus 1102 receives information by using the antenna 1101, and sends the received information to the baseband apparatus 1103 for processing. In a downlink direction, the baseband apparatus 1103 processes to-be-sent information, and sends the information to the radio frequency apparatus 1102; and the radio frequency apparatus 1102 processes the received information and then sends the information out by using the antenna 1101.

The frequency band processing apparatus may be located in the baseband apparatus 1103. The method performed by the network-side device in the foregoing embodiments may be implemented in the baseband apparatus 1103, and the baseband apparatus 1103 includes a processor 1104 and a memory 1105.

The baseband apparatus 1103 may include, for example, at least one baseband board, where a plurality of chips are disposed on the baseband board. As shown in FIG. 11, one of the chips, for example, the processor 1104, is connected to the memory 1105, to invoke a program in the memory 1105 to perform the operation of the network device shown in the foregoing method embodiments.

The baseband apparatus 1103 may further include a network interface 1106, configured to exchange information with the radio frequency apparatus 1102, where the interface is, for example, a common public radio interface (CPRI).

For example, the network-side device in this embodiment of the present application further includes: instructions or a program stored in the memory 1105 and executable on the processor 1104. The processor 1104 invokes the instructions or program in the memory 1105 to execute the method executed by the modules shown in FIG. 8, with the same technical effects achieved. To avoid repetition, details are not repeated herein.

An embodiment of this application further provides a non-transitory computer-readable storage medium, where a program or instructions are stored in the non-transitory computer-readable storage medium. When the program or the instructions are executed by a processor, the processes of the foregoing embodiment of the uplink control information transmission method shown in FIG. 2 can be implemented, or the processes of the foregoing embodiment of the uplink control information transmission method shown in FIG. 5 can be implemented with the same technical effects achieved. To avoid repetition, details are not described herein again.

The processor may be a processor in the terminal or the network-side device described in the foregoing embodiments. The non-transitory computer-readable storage medium includes a computer read-only memory (ROM), a random access memory (RAM), a magnetic disk, or an optical disc.

An embodiment of this application further provides a chip, where the chip includes a processor and a communications interface. The communications interface is coupled to the processor. The processor is configured to execute a program or instructions on the network-side device to implement the processes of the foregoing embodiments of the uplink control information transmission method shown in FIG. 2, or the processor is configured to execute a program or instructions on the terminal to implement the processes of the foregoing embodiments of the uplink control information transmission method shown in FIG. 5, with the same technical effects achieved. To avoid repetition, details are not described herein again.

A computer program product is provided, where the computer program product includes a processor, a memory, and a program or instructions stored in the memory and executable on the processor, and when the program or the instructions are executed by the processor, the processes of the foregoing embodiments of the uplink control information transmission method shown in FIG. 2 are implemented, or the processes of the foregoing embodiments of the method shown in FIG. 5 are implemented, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. Based on such an understanding, the technical solutions of the present application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An uplink control information transmission method, comprising:

determining, by a terminal, uplink control information to be multiplexed over one target physical uplink channel for transmission, wherein the uplink control information comprises:

a first hybrid automatic repeat request acknowledgement (HARQ-ACK), a second HARQ-ACK, and channel state information (CSI), wherein a priority of the first HARQ-ACK is a first priority, a priority of the second HARQ-ACK is a second priority, and the first priority is higher than the second priority;

the target physical uplink channel comprises a physical uplink shared channel; and if the priority of the CSI is the first priority and the CSI comprises no second part of channel state information (CSI-part 2):

multiplexing, by the terminal, the first HARQ-ACK, the second HARQ-ACK, and the CSI over the target physical uplink channel for transmission; wherein the first HARQ-ACK, the second HARQ-ACK, and the CSI are encoded separately.

2. The method according to claim 1, wherein the method further comprises:

if the priority of the CSI is the second priority and the CSI comprises no CSI-part 2:

multiplexing, by the terminal, the first HARQ-ACK, the second HARQ-ACK, and the CSI over the target physical uplink channel for transmission; wherein the first HARQ-ACK, the second HARQ-ACK, and the CSI are encoded separately.

3. The method according to claim 1, wherein the method further comprises:

if the priority of the CSI is the second priority and the CSI comprises the CSI-part 2:

discarding, by the terminal, the CSI-part 2; and multiplexing, by the terminal, the first HARQ-ACK, the second HARQ-ACK, and the CSI-part 1 over the target physical uplink channel for transmission; the first HARQ-ACK being encoded separately, the second HARQ-ACK being encoded separately, and the CSI-part 1 of the CSI being encoded separately.

4. The method according to claim 1, wherein the method further comprises:

if the priority of the CSI is the first priority and the CSI comprises the CSI-part 2:

multiplexing, by the terminal, the first HARQ-ACK, the second HARQ-ACK, and the CSI over the target physical uplink channel for transmission; the first HARQ-ACK being encoded along with the CSI-part 1 of the CSI, the second HARQ-ACK being encoded separately, and the CSI-part 2 of the CSI being encoded separately; or multiplexing, by the terminal, the first HARQ-ACK, the second HARQ-ACK, and the CSI over the target physical uplink channel for transmission; the first HARQ-ACK being encoded along with the second HARQ-ACK, the CSI-part 1 of the CSI being encoded separately, and the CSI-part 2 of the CSI being encoded separately; or multiplexing, by the terminal, the first HARQ-ACK, the second HARQ-ACK, and the CSI over the target physical uplink channel for transmission; the first HARQ-ACK being encoded along with the CSI-part 1 of the CSI, and the second HARQ-ACK being encoded along with the CSI-part 2; or multiplexing, by the terminal, the first HARQ-ACK, the second HARQ-ACK, and the CSI over the target physical uplink channel for transmission; the first HARQ-ACK being encoded separately, the second HARQ-ACK being encoded separately, and the CSI-part 1 of the CSI being encoded along with the CSI-part 2; or discarding, by the terminal, the CSI-part 2; and multiplexing, by the terminal, the first HARQ-ACK, the second HARQ-ACK, and the CSI-part 1 over the target physical uplink channel for transmission; the first HARQ-ACK being encoded separately, the second HARQ-ACK being encoded separately, and the CSI-part 1 of the CSI being encoded separately; or discarding, by the terminal, the CSI-part 2; and multiplexing, by the terminal, the first HARQ-ACK, the second HARQ-ACK, and the CSI-part 1 over the target physical uplink channel for transmission; the first HARQ-ACK being encoded separately, and the second HARQ-ACK being encoded along with the CSI-part 1; or discarding, by the terminal, the CSI-part 2; and multiplexing, by the terminal, the first HARQ-ACK, the second HARQ-ACK, and the CSI-part 1 over the target physical uplink channel for transmission; the first HARQ-ACK being encoded separately, the CSI-part 1 being encoded separately, and the second HARQ-ACK being encoded separately.

5. The method according to claim 1, wherein the first priority is represented by a priority index 1, and the second priority is represented by a priority index 0.

6. An uplink control information transmission method, comprising:

determining, by a network-side device, uplink control information to be multiplexed by a terminal over one target physical uplink channel for transmission, wherein the uplink control information comprises: a first hybrid automatic repeat request acknowledgement (HARQ-ACK), a second HARQ-ACK, and channel state information (CSI), wherein a priority of the first HARQ-ACK is a first priority, a priority of the second HARQ-ACK is a second priority, and the first priority is higher than the second priority;

the target physical uplink channel comprises a physical uplink shared channel; and if the priority of the CSI is the first priority and the CSI comprises no second part of channel state information (CSI-part 2):

receiving, by the network-side device, the first HARQ-ACK, the second HARQ-ACK, and the CSI over the target physical uplink channel for transmission; wherein the first HARQ-ACK, the second HARQ-ACK, and the CSI are encoded separately.

7. The method according to claim 6, wherein the method further comprises:

if the priority of the CSI is the second priority and the CSI comprises no CSI-part 2:

receiving, by the network-side device, the first HARQ-ACK, the second HARQ-ACK, and the CSI over the target physical uplink channel for transmission; wherein the first HARQ-ACK, the second HARQ-ACK, and the CSI are encoded independently.

8. The method according to claim 6, wherein the method further comprises:

if the priority of the CSI is the second priority and the CSI comprises the CSI-part 2:

receiving, by the network-side device, the first HARQ-ACK, the second HARQ-ACK and the CSI in which the CSI-part 2 is discarded, multiplexed over the target physical uplink channel; the first HARQ-ACK being encoded separately, the second HARQ-ACK being encoded separately, and the CSI-part 1 of the CSI being encoded separately.

9. The method according to claim 6, wherein the method further comprises:

if the priority of the CSI is the first priority and the CSI comprises the CSI-part 2:

receiving, by the network-side device, the first HARQ-ACK, the second HARQ-ACK and the CSI multiplexed over the target physical uplink channel; the first HARQ-ACK being encoded along with the CSI-part 1 of the CSI, the second HARQ-ACK being encoded separately, and the CSI-part 2 of the CSI being encoded separately; or receiving, by the network-side device, the first HARQ-ACK, the second HARQ-ACK and the CSI multiplexed over the target physical uplink channel; the first HARQ-ACK being encoded along with the second HARQ-ACK, the CSI-part 1 of the CSI being encoded separately, and the CSI-part 2 of the CSI being encoded separately; or receiving, by the network-side device, the first HARQ-ACK, the second HARQ-ACK and the CSI multiplexed over the target physical uplink channel; the first HARQ-ACK being encoded along with the CSI-part 1 of the CSI, and the second HARQ-ACK being encoded along with the CSI-part 2; or receiving, by the network-side device, the first HARQ-ACK, the second HARQ-ACK and the CSI multiplexed over the target physical uplink channel; the first HARQ-ACK being encoded separately, the second HARQ-ACK being encoded separately, and the CSI-part 1 of the CSI being encoded along with the CSI-part 2; or receiving, by the network-side device, the first HARQ-ACK, the second HARQ-ACK and the CSI in which the CSI-part 2 is discarded, multiplexed over the target physical uplink channel; the first HARQ-ACK being encoded separately, the second HARQ-ACK being encoded separately, and the CSI-part 1 of the CSI being encoded separately; or receiving, by the network-side device, the first HARQ-ACK, the second HARQ-ACK and the CSI in which the CSI-part 2 is discarded, multiplexed over the target physical uplink channel; the first HARQ-ACK being encoded separately, and the second HARQ-ACK being encoded along with the CSI-part 1; or receiving, by the network-side device, the first HARQ-ACK, the second HARQ-ACK and the CSI in which the CSI-part 2 is discarded, multiplexed over the target physical uplink channel; the first HARQ-ACK being encoded separately, the CSI-part 1 being encoded separately, and the second HARQ-ACK being encoded separately.

10. The method according to claim 6, wherein the first priority is represented by a priority index 1, and the second priority is represented by a priority index 0.

11. A terminal, comprising a processor, a memory, and a program or instructions stored in the memory and executable on the processor, wherein the program or the instructions, when executed by the processor, cause the terminal to perform:

determining uplink control information to be multiplexed over one target physical uplink channel for transmission, wherein the uplink control information comprises: a first hybrid automatic repeat request acknowledgement (HARQ-ACK), a second HARQ-ACK, and channel state information (CSI), wherein a priority of the first HARQ-ACK is a first priority, a priority of the second HARQ-ACK is a second priority, and the first priority is higher than the second priority;

the target physical uplink channel comprises a physical uplink shared channel; and if the priority of the CSI is the first priority and the CSI comprises no second part of channel state information (CSI-part 2):

multiplexing, by the terminal, the first HARQ-ACK, the second HARQ-ACK, and the CSI over the target physical uplink channel for transmission; wherein the first HARQ-ACK, the second HARQ-ACK, and the CSI are encoded separately.

12. The terminal according to claim 11, wherein the program or the instructions, when executed by the processor, cause the terminal to perform:

if the priority of the CSI is the second priority and the CSI comprises no CSI-part 2:

multiplexing, by the terminal, the first HARQ-ACK, the second HARQ-ACK, and the CSI over the target physical uplink channel for transmission; wherein the first HARQ-ACK, the second HARQ-ACK, and the CSI are encoded separately.

13. The terminal according to claim 11, wherein the program or the instructions, when executed by the processor, cause the terminal to perform:

if the priority of the CSI is the second priority and the CSI comprises the CSI-part 2:

discarding, by the terminal, the CSI-part 2; and multiplexing, by the terminal, the first HARQ-ACK, the second HARQ-ACK, and the CSI-part 1 over the target physical uplink channel for transmission; the first HARQ-ACK being encoded separately, the second HARQ-ACK being encoded separately, and the CSI-part 1 of the CSI being encoded separately.

14. The terminal according to claim 11, wherein the first priority is represented by a priority index 1, and the second priority is represented by a priority index 0.

15. A network-side device, comprising a processor, a memory, and a program or instructions stored in the memory and executable on the processor, wherein when the program or the instructions are executed by the processor, the steps of the uplink control information transmission method according to claim 6 are implemented.

16. A non-transitory computer-readable storage medium, wherein the non-transitory computer-readable storage medium stores a program or instructions, and when the program or the instructions are executed by a processor, the uplink control information transmission method according to claim 1 is implemented.

17. A non-transitory computer-readable storage medium, wherein the non-transitory computer-readable storage medium stores a program or instructions, and when the program or the instructions are executed by a processor, the uplink control information transmission method according to claim 6 is implemented.

* * * * *